US 6,698,732 B2

(12) United States Patent
Takashima et al.

(10) Patent No.: US 6,698,732 B2
(45) Date of Patent: Mar. 2, 2004

(54) CONTROL TYPE LIQUID FILLED VIBRATION ISOLATING DEVICE

(75) Inventors: Yukio Takashima, Osaka (JP); Masaaki Ito, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 0 days.

(21) Appl. No.: 10/049,476

(22) PCT Filed: Jun. 25, 2001

(86) PCT No.: PCT/JP01/05427
§ 371 (c)(1),
(2), (4) Date: Mar. 19, 2002

(87) PCT Pub. No.: WO02/16798
PCT Pub. Date: Feb. 28, 2002

(65) Prior Publication Data
US 2002/0149144 A1 Oct. 17, 2002

(30) Foreign Application Priority Data
Aug. 24, 2000 (JP) ......................... 2000-254148

(51) Int. Cl.[7] ................................. F16F 13/00
(52) U.S. Cl. .................. 267/140.13; 267/141.2; 267/141.3
(58) Field of Search ................... 267/141.2, 141.3, 267/219, 140.11, 140.13, 140.2, 141, 141.1, 141.4

(56) References Cited

U.S. PATENT DOCUMENTS

| 4,630,808 | A |   | 12/1986 | Ushijima et al. |            |
|-----------|---|---|---------|-----------------|------------|
| 5,167,403 | A | * | 12/1992 | Muramatsu et al.| 267/140.13 |
| 5,170,998 | A | * | 12/1992 | Muramatsu       | 267/140.13 |
| 5,215,293 | A | * | 6/1993  | Muramatsu et al.| 267/140.14 |
| 5,217,211 | A | * | 6/1993  | Ide et al.      | 267/140.13 |
| 5,246,212 | A | * | 9/1993  | Funahashi et al.| 267/140.13 |
| 5,314,173 | A | * | 5/1994  | Ide et al.      | 267/140.14 |
| 5,499,799 | A | * | 3/1996  | Kojima          | 267/140.13 |
| 5,769,402 | A | * | 6/1998  | Ide et al.      | 267/140.14 |
| 6,082,718 | A | * | 7/2000  | Yamada et al.   | 267/140.14 |
| 6,176,477 | B1| * | 1/2001  | Takeo et al.    | 267/140.11 |
| 6,412,760 | B2| * | 7/2002  | Shimoda et al.  | 267/140.13 |
| 6,425,575 | B1| * | 7/2002  | Takashima et al.| 267/140.13 |
| 2002/0005607 | A1 | * | 1/2002 | Muramatsu et al. | 267/140.11 |

FOREIGN PATENT DOCUMENTS

| DE | 4121939      |   | 1/1993 |
|----|--------------|---|--------|
| JP | 2002-81491   | * | 3/1992 |
| JP | 5-118375     | * | 5/1993 |
| JP | 11-173372    |   | 6/1999 |
| JP | 2000-205328  |   | 7/2000 |
| JP | 2000-521238  | * | 7/2000 |
| JP | 2001-20992   | * | 1/2001 |

* cited by examiner

Primary Examiner—Christopher P. Schwartz
Assistant Examiner—Devon Kramer
(74) Attorney, Agent, or Firm—Jordan and Hamburg LLP

(57) ABSTRACT

A double orifice type liquid-in vibration isolating device including a partition portion fitted between a vibration isolating substrate combined through a body fitting and a first diaphragm made up of a partition main member forming a first orifice, a partition plate member forming a second sub-liquid chamber and a second orifice, and a partition support plate forming the first orifice. An inlet/outlet on the main liquid chamber side of both orifices is common to both orifices. The first orifice is diverged from a part of the second orifice having a liquid passing resistance smaller than that of the first orifice to provide two orifices compactly. Any variation or change of the property can easily be coped with by circumferential position adjustment of the component members of the partition portion.

18 Claims, 3 Drawing Sheets

CONTROL TYPE LIQUID FILLED VIBRATION ISOLATING DEVICE

FIELD OF THE INVENTION

This invention relates to a control type liquid-in vibration isolating device used to support a power unit of an automobile engine and the like for the purpose of vibration isolation.

BACKGROUND OF THE INVENTION

A control type liquid-in vibration isolator or isolating device, in which vibration isolating characteristics are obtained according to two kinds of vibration with different frequency range such as shake and idle vibration, has previously been suggested as a liquid-in vibration isolating device used for a mount supporting a vibration generating body such as an automobile engine and the like so as not to transmit its vibration to a vehicle body.

For example, for a conventional liquid-in vibration isolating device, a switching control type liquid-in vibration isolating device comprises a vibration isolating substrate a rubber elastomer, a cylindrical body fitting connected with the vibration isolating substrate, a first diaphragm fitted to the body fitting opposite to the vibration isolating substrate, a partition portion interposed between the vibration isolating substrate and the first diaphragm. A main liquid chamber is formed between the partition portion and the vibration isolating substrate and a first sub-liquid chamber is formed between the partition portion and the first diaphragm to connect through a first orifice with the main liquid chamber. A second sub-liquid chamber connects through the second orifice with the main liquid chamber, and a switching chamber for the atmospheric or negative pressure is formed separated through the second diaphragm from the second sub-liquid chamber.

As this kind of existing double-orifice control type liquid-in vibration isolating device, two orifices which connect the main liquid chamber with the first and second sub-liquid chambers are either serially connected or disposed in parallel, respectively.

Therefore, in order to form another orifice, the cost is increased due to extra processing required, increased number of manhours needed for manufacturing, additional space required for storage, and the larger outside diameter and weight of the device. Besides, if the property is varied due to errors of accuracy and the like of the components, one will not make adjustments easily and also cannot cope with a change in the property easily, with the result that the adjustments will be troublesome.

The present invention has been made in view of the problems described above, and provides the control type liquid-in vibration isolating device capable of easily coping with a variation or change of the property and also providing two orifices compactly.

SUMMARY OF THE INVENTION

A liquid-in vibration isolating device of the present invention comprises a vibration isolating substrate a rubber elastomer, a cylindrical body fitting connected with the vibration isolating substrate, a first diaphragm fitted and adhered to the body fitting opposite to the vibration isolating substrate, a partition portion interposed between the vibration isolating substrate and the first diaphragm, a main liquid chamber formed between the partition portion and the vibration isolating substrate, a first sub-liquid chamber formed between the partition portion and the first diaphragm, a second sub-liquid chamber provided with a second diaphragm on the main liquid chamber side of the partition portion, the main liquid chamber and the first and second sub-liquid chambers being connected through the orifice, respectively, and has the following configuration to alleviate the problems described above.

The partition portion comprises a partition main member forming a first orifice connecting the first sub-liquid chamber, a partition plate member forming the second sub-liquid chamber and a second orifice connecting to the sub-liquid chamber in combination with the partition main member on the main liquid chamber side, and these members are fitted to the body fitting. The first and second orifices share an inlet/outlet on the main liquid chamber side, and the first orifice is diverged from a part of a path of the second orifice having a smaller liquid passing resistance than that of the first orifice. As idle vibration, the second orifice has a sectional area, that is, a path cross-sectional area larger than the first orifice for the shake vibration.

According to the liquid-in type vibration isolating device, since the first orifice connecting the main liquid chamber and the first sub-liquid chamber is diverged from a part of the path of the second orifice having a small liquid passing resistance connecting the main liquid chamber and the second sub-liquid chamber, two orifices can be configured compactly in spite of double orifice type vibration isolating device. Also, the number of manhours needed for manufacturing is decreased and the cost of manufacturing can also be reduced by sharing a single inlet/outlet of both orifices on the main liquid chamber side.

By sharing a single inlet/outlet of both orifices on the main liquid chamber side as described above, a variation in the property is diminished. Besides, one can easily cope or deal with any variation or change in the property by making a position adjustment when combining with the partition main member and/or the partition plate member which form the first and second orifices.

Furthermore, since the sectional area of the second orifice for the idle vibration is larger than that of the first orifice for the shake vibration, the second orifice exhibits vibration damping function for the idle vibration, and the first orifice for the shake vibration exhibits vibration damping function which is hardly affected by the path from the inlet/outlet to the divergent position of the first orifice.

As for the control liquid-in vibration isolating device, it is desirable that the second diaphragm is disposed inwardly on the main liquid chamber side of the partition main member to form a switching chamber capable of selectively introducing the atmospheric and negative pressure, and that the circumferential edge portion of the second diaphragm is forced or pushed-in by the partition plate member disposed on the main liquid chamber side of the partition main member to form the second sub-liquid chamber between the diaphragm and itself. It is also desireable that a hollow space surrounded between the partition main member and the partition plate member is formed outwardly thereof as the second orifice extending circumferentially.

With the foregoing construction, the function of the first and second orifices can be changed over and controlled easily by introducing the atmospheric and negative pressure into the switching chamber.

The liquid-in type vibration isolating device can be configured by providing the divergent path of the first orifice opening to the second orifice path on the partition main member, opening the inlet/outlet into the main liquid chamber on a part of the partition plate member, and adjusting and combining the circumferential position of the partition plate member as against the partition main member. Consequently, one can make adjustments in the property during assembly or adjustments for a property change easily, thus obtaining stable properties.

The partition main portion can be configured by forming a concave portion for the orifice continuously connected from the divergent path on the first sub-liquid chamber side, forming the first orifice with the concave portion on the first sub-liquid chamber side covered by the partition support plate, and providing an opening at a part of the position corresponding to the concave portion on the partition support plate. Consequently, one can easily produce the partition main member, and also easily adjust the length of the first orifice by adjusting the position of the opening within a range of the length of the concave portion.

DETAILED DESCRIPTION OF THE INVENTION

Embodiments of the invention will be hereinafter described by way of examples with reference to the accompanying drawings.

Figure 1:
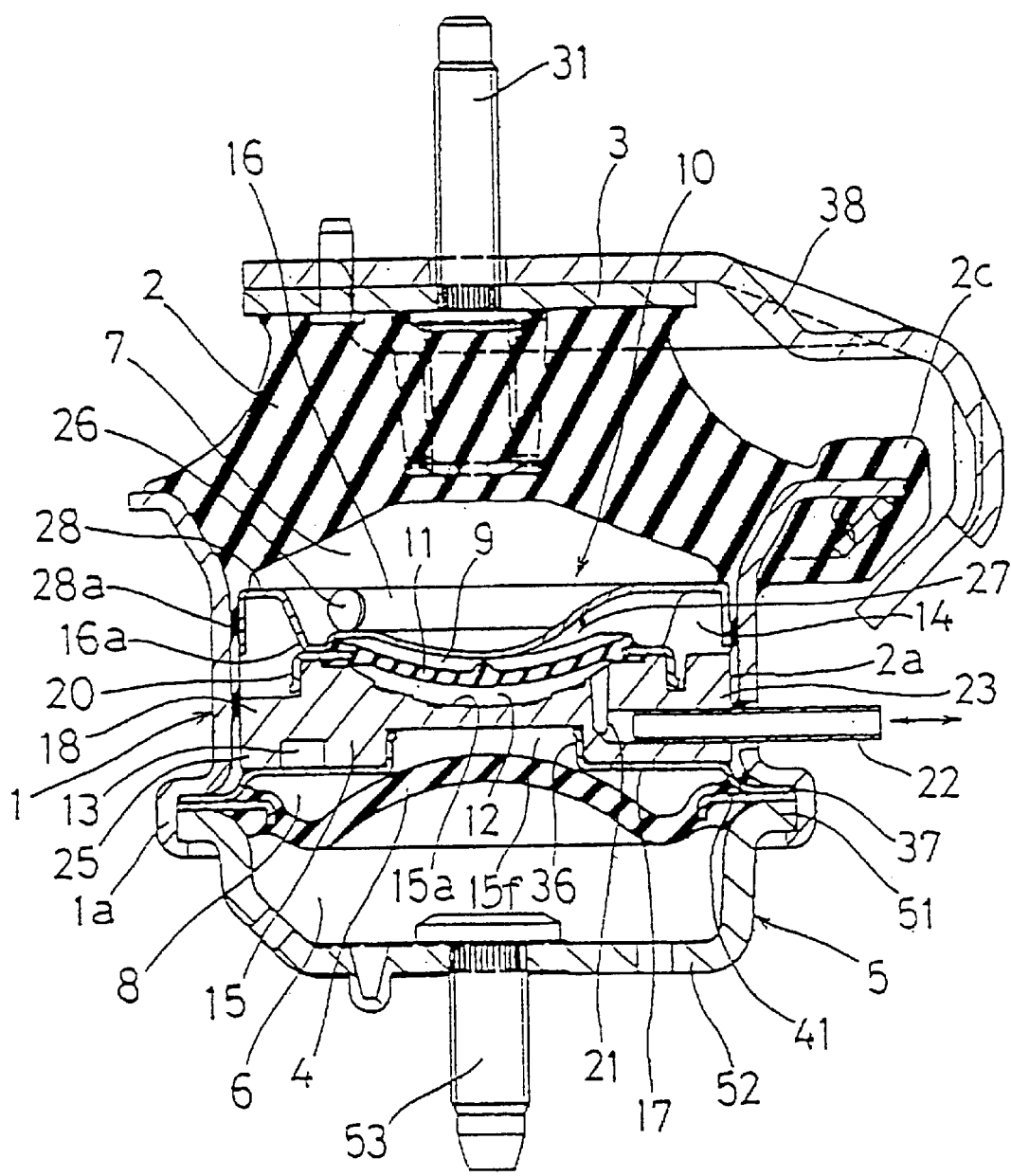
FIG. 1 is a longitudinal sectional view showing one embodiment of a control type liquid-in vibration isolating device of the present invention.

In the liquid-in vibration isolating device A shown in FIG. 1, a vibration isolating substrate 2 comprising a rubber elastomer, to which a load of power unit such as an engine is applied, is connected on the upper opening side of a cylindrical body fitting 1, and a first attachment fitting 3 is connected to the upper extremity of the vibration isolating substrate 2. That is, the body fitting 1 and the first attachment fitting 3 are connected through the vibration isolating substrate 2.

The vibration isolating substrate 2 assumes a nearly truncated cone form, the upper extremity thereof on the small diameter side is securely attached to the first attachment fitting 3 and the outer circumferential portion on the large diameter side at the lower portion is securely attached to an opening portion of the body fitting 1 air-tightly by vulcanization adhering means, respectively.

On the lower opening side of the body fitting 1, a first diaphragm 4 made up of a rubber film arranged opposite to the vibration isolating substrate 2 and a second attachment fitting 5 covering the outside thereof are fixed to a caulking and securing means described later under a sealing condition. A ring-shaped reinforcing member 41 is vulcanization adhered on the outer circumferential portion of the first diaphragm 4.

The first attachment fitting 3 assumes a nearly circular plate form. An attachment bolt 31 secured by a press-fit means or a welding means is fitted upwardly on the center portion of the first attachment fitting 3. The liquid-in vibration isolating device A is fixed to the power unit of the vehicle by means of the attachment bolt 31.

The second attachment fitting 5 assumes a bottomed nearly cylindrical form. A flanged opening edge portion 51 is caulked and secured at the lower extremity 1a of the body fitting 1 together with a partition portion 10 described later. An attachment bolt 53 is fitted downwardly on a bottom wall portion 52 of the second attachment fitting 5 by means of a press-fit means and the like. The liquid-in vibration isolating device A is positioned and fixed to the vehicle body side member by means of the attachment bolt 53. A hollow space between the second attachment fitting 5 and the first diaphragm 4 is formed as an air chamber 6. The air chamber 6 is either passed through the atmosphere or taken as an airtight chamber.

The partition portion 10 is fitted in an air-tight manner, through a seal rubber layer 2a integrally formed with the vibration isolating substrate 2, on an inner circumference of the body fitting 1 between the vibration isolating substrate 2 and the first diaphragm 4.

Provided that an incompressible liquid such as water or ethylene glycol is contained in an inner chamber between the vibration isolating substrate 2 and the first diaphragm 4, and that the inner chamber is further partitioned and configured by the partition portion 10, a hollow space between the vibration isolating substrate 2 and the partition portion 10 is formed as a main liquid chamber 7, and a hollow space between the first diaphragm 4 and the partition portion 10 is formed as a first sub-liquid chamber 8.

Further, the partition portion 10 has a second sub-liquid chamber 9 on the side of the main liquid chamber 7, and a switching chamber 12 which is set apart from the second sub-liquid chamber 9 via a second diaphragm 11 to be able to change over and introduce the atmospheric pressure and negative pressure. A first orifice 13 and a second orifice 14, each having different liquid passing resistance, which connect with the main liquid chamber 7 and the first and second sub-liquid chambers 8, 9, respectively, are provided on the outer circumferential portion of the partition portion 10.

In the illustrated embodiment, the first orifice 13 connecting to the first sub-liquid chamber 8 has a relatively small sectional area, and the second orifice 14 connecting to the second sub-liquid chamber 9 has a larger path sectional area (sectional area in the direction of crossing the path) than the first orifice 13, that is, the second orifice 14 is set so as to have small liquid passing resistance.

As shown in FIGS. 1–4, the partition portion 10 comprises a partition main member 15, a partition plate member 16, a partition support plate 17, and has the following configuration.

Figure 2:
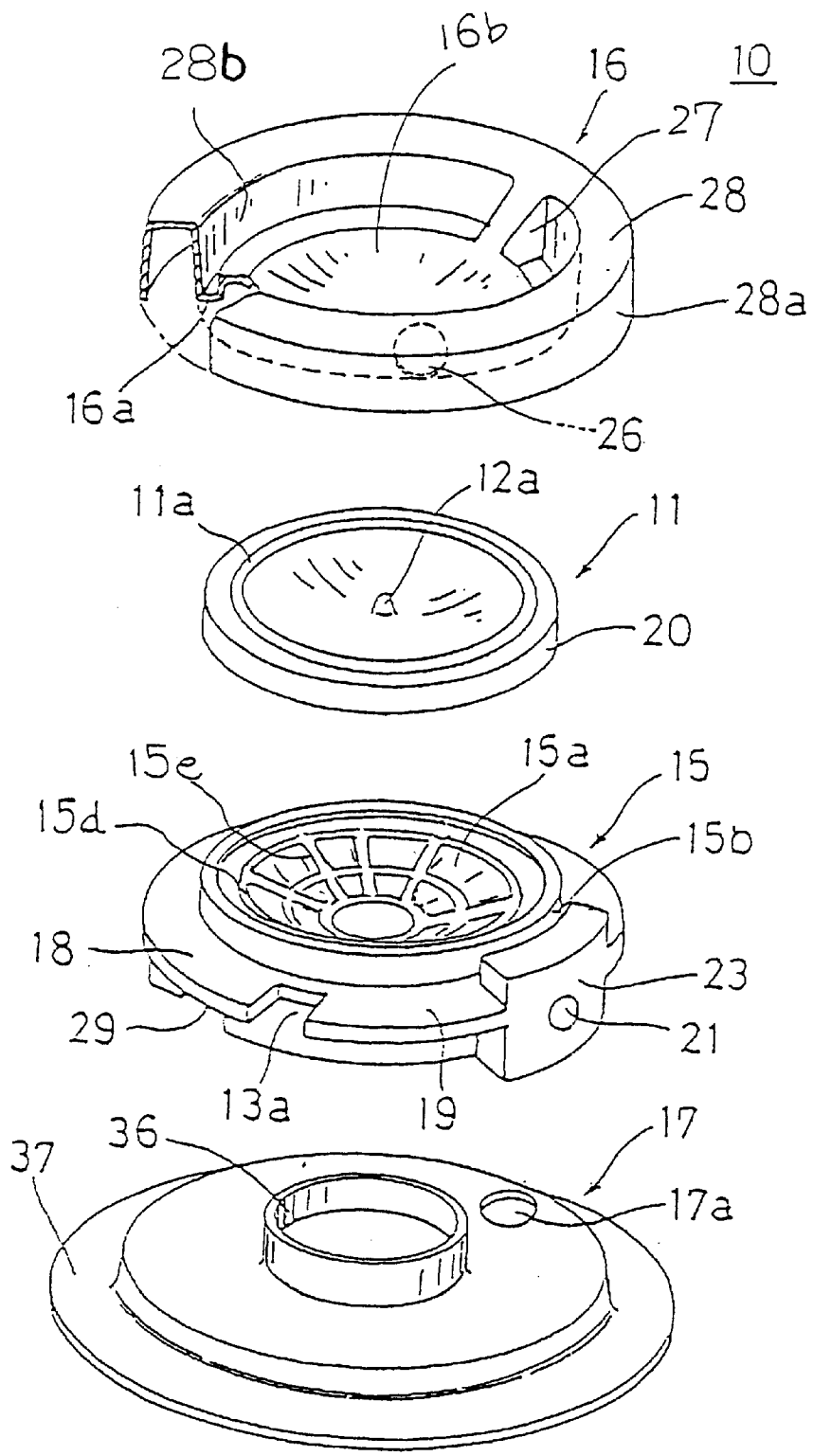
FIG. 2 is a perspective view of a partition portion separating each constituting portion of the control type liquid-in vibration isolating device.
Figure 3:
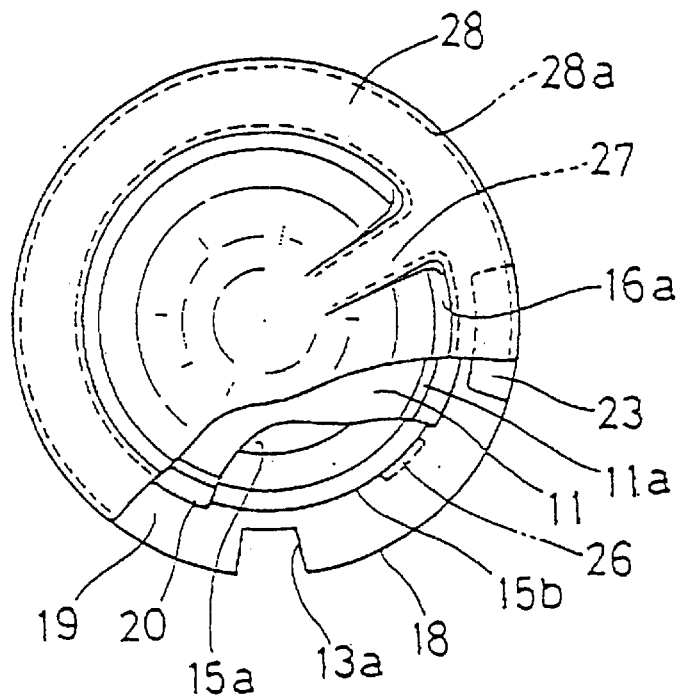
FIG. 3 is a partial cutaway perspective view of a combination of a partition main member and a partition plate member.
Figure 4:
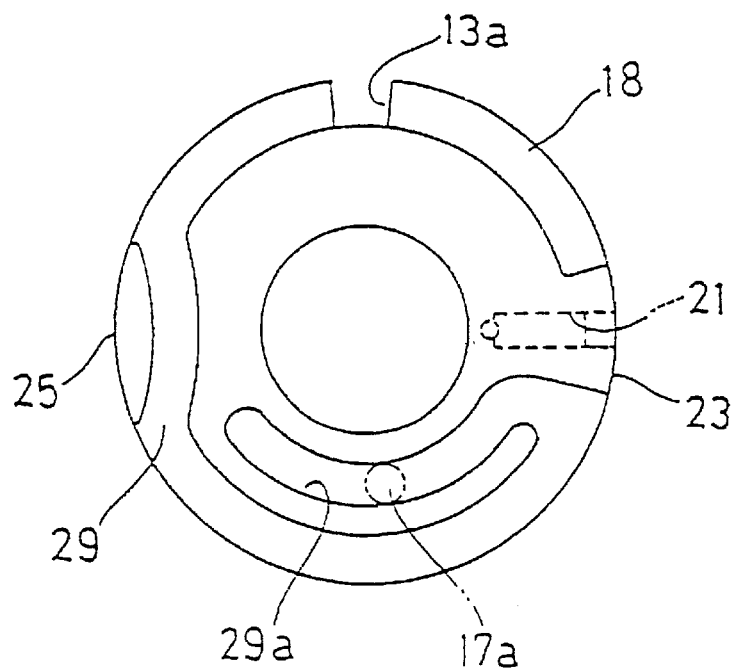
FIG. 4 is a bottom plan view of the partition main member.

The partition main member 15 is formed by projecting a flanged circular outer circumferential portion 18 at an intermediate position in the up and down direction on the side of a cylindrical column portion 15b as shown in FIGS. 2–4, and is integrally formed by metal materials such as aluminum or rigid materials such as synthetic resin.

On the upper and lower surface of the circular outer circumferential portion 18, that is, on both sides of the main liquid chamber 7 and the first sub-liquid chamber 8, the concave portions 19, 29 for the orifice forming the first and second orifices 13, 14 are formed by a combination of the partition plate member 16 and the partition support plate 17.

The upper surface center portion on the main liquid chamber side of the cylindrical column portion 15b is concave, i.e., in the form of a curve. A second diaphragm 11 is fitted and adhered so as to cover the concave portion 15a . A hollow space between the second diaphragm 11 and the concave portion 15a forms the switching chamber 12. A ring-shaped groove 15d and a longitudinal groove 15e radially joining with the ring-shaped groove 15d are formed on the concave portion 15a forming the switching chamber 12, thereby allowing the negative pressure to be continued even when the second diaphragm 11 comes into contact with the concave portion 15a side.

An annular collar fitting 20 is fitted and secured on the outer circumferential portion of the second diaphragm 11 by the vulcanization adhering means. By press-fitting the collar fitting 20 to the outer circumferential surface of the cylindrical column portion 15b of the partition main member 15, the second diaphragm 11 will be fitted and adhered concentrically with the central axis of the partition main member 15. In addition, a protrusion 12a is formed at the center of the second diaphragm 11 to maintain the predetermined clearance between a partition plate member 16 described later and a curve portion 16b so as to secure the second sub-liquid chamber 9.

A path 21 passing through the inside of the switching chamber 12 and connecting from the side surface to the outer circumferential portion is formed on the partition main member 15, and an introducing pipe 22 for switching the atmospheric and negative pressure which passes through the body fitting 1 is press-fitted to the path 21. The switching chamber 12 is connected to switching means (not shown) such as switching valve which can selectively connect with either the negative or atmospheric pressure source through these paths 21 and the introducing pipe 22, and can introduce either negative or atmospheric pressure according to command signals and the like from control means.

Switching control to either the negative or atmospheric pressure in the switching chamber 12 can change over the second diaphragm 11 to either an operable or inoperable condition. For example, in order to operate only the first orifice 13 having a large liquid passing resistance, operation of the second diaphragm 11 is stopped so as not to operate the second orifice 14 having a large sectional area.

The partition plate member 16 is press-molded mainly by a steel plate and the like. A concaved curve portion 16b constituting a wall surface of the second sub-liquid chamber 9, an annular circumferential edge portion 28 formed in the form of a turned down concave section on its circumferential edge, and an annular projection 16a projectively formed outwardly of the curve portion 16b and on the inside lower surface of the circumferential edge portion 28 are integrally made in one piece.

The partition plate member 16 is press-fitted and secured to the inner circumference of the body fitting 1 on the side of the main liquid chamber 7 of the partition main member 15, positioned and held between the partition main member 15 and the circumferential edge portion in the main liquid chamber 7 of the vibration isolating substrate 2 so that the circumferential edge portion 11a of the second diaphragm 11 is pressed and sealed by the annular protrusion 16a and the upper surface of the center column portion 15b of the partition main member 15.

Accordingly, a hollow space between the curve portion 16b inward of the protrusion 16a and the diaphragm 11 assumes the second sub-liquid chamber 9, and further outwardly, a hollow space between the outer circumferential portion 18 of the partition main member 15 and the circumferential edge portion 28 of the partition plate member 16 also assumes the second orifice 14 having a relatively large sectional area which connects the main liquid chamber 7 and the second sub-liquid chamber 9.

The second orifice 14 is connected to the main liquid chamber 7 through an inlet/outlet 26 opened at a part of an inside plate 28b of the circumferential edge portion 28 of the partition plate member The second orifice 14 is further connected to the second sub-liquid chamber 9 through a connecting portion 27 in the form of a triangular section formed from an inside plate 28b of the circumferential edge portion 28 toward the curve portion 16b.

The section of the second orifice 14 is surrounded by the circumferential edge portion 28 in the form of the turned down concave section of the partition plate member 16, the concave portion 19 formed by the outside of the center column portion 15b of the partition main member 15 and the outer circumferential portion 18, and the inner circumference of the body fitting 1. In particular, the larger sectional area of the orifice is provided by the concave portion 19 of the partition main member 15.

A convex portion 23 is formed on the upper surface side of the outer circumferential portion 18 of the partition main member 15 by leaving a part of the path 21 on the opening end side in a convex form, and a hollow space surrounded by the convex portion 23, the inner circumference of the body fitting 1, and the circumferential edge portion 28 of the partition plate member 16 assumes the section of the second orifice 14.

On the other hand, the first orifice 13, which interconnects the main liquid chamber 7 and the first sub-liquid chamber 8, forms a continuous flow path when a part of a concave portion 29 is parted at the lower surface side of the partition main member 15 by a partition support plate 17 and the inner circumferential surface of the body fitting 1 or when the rest of the concave portion 29 is parted by the partition support plate 17.

The first orifice 13 is connected to the main liquid chamber 7 by a divergent path 13a which is notched on the flanged outer circumferential portion 18 of the partition main member 15. The divergent path 13a has an opening on the concave portion 19 at any position of a path of the second orifice 14, in particular, a part of the path halfway excluding the corresponding position to the inlet/outlet 26. In this manner, the first orifice 13 is in the state divergent from a part of the path of the second orifice 14. Therefore, the first orifice 13 is connected from the divergent path 13a through a part of the path of the second orifice 14 and the inlet/outlet 26 to the main liquid chamber 7. That is, the first orifice 13 and the second orifice 14 share the inlet/outlet 26 to the main liquid chamber 7.

As shown in FIG. 4, the concave portion 29 on the lower surface of the partition main member 15 is formed by avoiding a convex portion 25 at the position opposite to the convex portion 23, and inwardly folded at the required points and extends in the form of a circular arc centering the axis center of the device so as to have a length of nearly 1.0 to 1.5 times larger than the circumference of a circle, preferably not exceeding 1.5 times larger than the circumference of a circle. In FIG. 4, the reference numeral 29a denotes a concave portion folded and extended in the form of a circular arc.

The partition support plate 17 is press-molded by a steel plate and the like similar to the partition plate member 16, and has an opening at the center and assumes a circular plate in the form of a doughnut having a slightly larger diameter than the partition main member 15. On the side of the first sub-liquid chamber 8 of the partition main member 15, when an opening edge portion 36 at the center portion is press-fitted into a concave portion 15f formed on the center lower surface of the partition main member 15, the partition support plate 17 is contiguously and oppositely fixed so as to cover the concave portion 29 for the orifice under the condition that the outer circumferential edge portion 37 extends outwardly from the partition main member 15.

Under the fixed condition, an open hole 17a being set to an arbitrary longitudinal position of the folded circular concave portion 29a of the concave portion 29 is formed on the partition support plate 17, so that the first orifice 13 is connected to the first sub-liquid chamber 8.

Thus, the outer circumferential edge portion 37 of the partition support plate 17 is caulked and secured to the lower extremity 1a of the body fitting 1 together with a reinforcing member 41 of the first diaphragm 4 and an opening edge portion 51 of the second attachment fitting 5 before assembling.

In the embodiments shown, there is a projecting portion 2c reinforced by a part of the body fitting 1 at a part of the circumference of a circle on a large diameter side of the vibration isolating substrate 2, a part of a stabilizer 38 securely fitted to the first attachment fitting 3 by a concurrently tightening means and the like with a nut is disposed closely above or below the projecting portion 2c, so as to perform a stopper function by restraining excess vertical displacement at the time of large displacement.

In order to assemble the liquid-in vibration isolating device A according to the above configuration, in the first place by press-fitting the collar fitting 20 to the center column portion 15b in the air, cover the concave portion 15a on the upper surface of the partition main member 15 with the second diaphragm 11 to form the switching chamber 12 between the diaphragm 11 and the partition main member 15. Furthermore, the partition support plate 17 is positioned and secured on the side of the first sub-liquid chamber 8 (lower surface side) of the partition main member 15 by the press-fitting means at the center portion, and the open hole 17a present on the partition support plate 17 is set to the position of the concave portion 29a which is extended from the concave portion 29 for the orifice present on the lower surface of the partition main member 15.

At this time, the length of the first orifice 13 can be adjusted by turning the partition support plate 17 circumferentially against the partition main member 15 in order to adjust the position of the open hole 17a along the length of the concave portion 29a.

Then, in the liquid bath, the partition plate member 16 is press-fit to the position abutting the vibration isolating substrate 2 and subsequently the partition main member 15 is press-fit to the position abutting the partition plate member 16, from the lower portion side under an opening condition before caulking and securing the lower extremity 1a to the body fitting 1 which is vulcanization secured integrally with the vibration isolating substrate 2, so as to fit each member through a seal rubber layer 2a liquid-tightly.

At this time, the position against the second orifice 14, that is, the orifice length can be adjusted by adjusting an angular position of the partition plate member 16 to the partition main member 15. This can also serve to cope with any variation or change of the properties.

Then, with the outer circumferential edge portion 37 of the partition support plate 17 brought into contact with the step portion inside the lower extremity of the body fitting 1, after being deaerated, the outer circumferential edge portion 37 of the partition support plate 17 may be caulked and secured to the lower extremity 1a of the body fitting 1 together with a reinforcing member 41 of the first diaphragm 4 and the opening edge portion 51 of the second attachment fitting 5.

The liquid intruding into the switching chamber 12 can be drained by taking out from the liquid bath. In addition, the switching chamber 12 can also be secured by removing a rubber plug inserted into the interconnecting path 21 prior to assembly.

Furthermore, a switching introduction pipe 22 for introducing the atmospheric and negative pressure into the switching chamber 12 is press-fitted into the path 21 present on the partition main member 15 through the body fitting 1 before assembling.

In this manner, the control type liquid-in vibration isolating device A comprising the main liquid chamber 7, two first and second sub-liquid chambers 8, 9, two first and second orifices 13, 14, and two first and second diaphragms 4, 11 as shown in FIG. 1 can be assembled and configured.

As described above, by diverging the first orifice 13 which interconnects between the main liquid chamber 7 and the first sub-liquid chamber 8 from a part of the path of the second orifice 14 having a small liquid passing resistance which interconnects between the main liquid chamber 7 and the second sub-liquid chamber 9 and further by making the inlet/outlet 26 on the main liquid chamber 7 side of both orifices 13, 14 into a single common one, two orifices can be configured compactly and the number of manufacturing processes may be decreased. It is also possible to easily cope with any variation or change of property by making a position adjustment of a combination of the partition main member 15 and the partition plate member 16 and/or a combination of the partition main member 15 and the partition plate member 17.

Furthermore, since a sectional area of the second orifice 14 for idle vibration is overwhelmingly larger than the first orifice 13 for shake vibration, the second orifice 14 effectively exhibits vibration damping function against the idle vibration, and the first orifice 13 exhibits vibration damping function without being affected by the paths from the inlet/outlet 26 to the divergent position of the first orifice 13 against the shake vibration.

As described above, a control type liquid-in vibration isolating device of the present invention can easily cope with any variation or change of properties and also provide two orifices compactly by diverging the first orifice from a part of the path of the second orifice having a small liquid passing resistance and further by making the inlet/outlet on the main liquid chamber side of both orifices into a single common one, thus enabling a reduction in manufacturing cost. Accordingly, it is desirable to apply the present invention to a control type liquid-in vibration isolating device which supports the power unit such as a vehicle engine for the purpose of vibration isolation.

What is claimed is:

1. A control-type liquid-in vibration isolating device, comprising:
   a vibration isolating substrate made of a rubber elastomer;
   a cylindrical body fitting connected to said vibration isolating substrate;
   a first diaphragm adhered to said body fitting opposite to said vibration isolating substrate,
   a partition portion interposed between said vibration isolating substrate and said first diaphragm and including a second diaphragm, a main liquid chamber being formed between said partition portion and said vibration isolating substrate, a first sub-liquid chamber being formed between said partition portion and said first diaphragm and a second sub-liquid chamber being formed in said partition portion on a side of said second diaphragm facing said main liquid chamber, said main liquid chamber and said first and second sub-liquid chambers being in fluid communication with one another, said partition portion comprising
- a partition main member defining a first orifice connecting to said first sub-liquid chamber, said partition main member having a concave portion formed on a lower surface,
- a partition plate member defining a second orifice connecting to said second sub-liquid chamber, said second diaphragm being interposed between said partition main member and said partition plate member, said first and second orifices sharing a common inlet/outlet on a side of said main liquid chamber, said first orifice being diverged from a part of a path of said second orifice having a smaller fluid resistance than said first orifice, and
- a support plate arranged between said partition main member and said first diaphragm, said support plate including a opening edge portion extending upwardly to define a central opening, said opening edge portion being press-fit into said concave portion on said lower surface of said partition main member.

2. The control type liquid-in vibration isolating device as set forth in claim 1, wherein said second orifice has a sectional area larger than said first orifice.

3. The control type liquid-in vibration isolating device as set forth in claim 1, wherein said second diaphragm is spaced from said partition main member to define a switching chamber between said second diaphragm and said partition main member, said switching chamber being capable of selectively introducing atmospheric and negative pressure.

4. The control type liquid-in vibration isolating device as set forth in claim 3, wherein said second diaphragm has a circumferential edge portion, said circumferential edge portion of said second diaphragm being forced by said partition plate member to form said second sub-liquid chamber between said second diaphragm and said partition plate member, and a hollow space defined by said partition main member and said partition plate member is formed outwardly of said second sub-liquid chamber as said second orifice extending circumferentially.

5. The control type liquid-in vibration isolating device as set forth in claim 4, wherein a divergent path of said first orifice leading to a path of said second orifice is provided on an outer circumferential portion of said partition main member, an inlet/outlet into said main liquid chamber is opened on a part of said partition plate member, and a circumferential position of said partition plate member is adjustable relative to said partition main member.

6. The control type liquid-in vibration isolating device as set forth in claim 5, wherein said partition main member is configured by forming a concave portion for said second orifice continuously connected from the divergent path on said first sub-liquid chamber side, forming said first orifice between a concave portion on said first sub-liquid chamber side covered by said support plate, and providing an opening at a part of a position corresponding to said concave portion on said support plate.

7. The control type liquid-in vibration isolating device as set forth in claim 5, wherein said partition main member is configured by forming a concave portion for said second orifice continuously connected from the divergent path on said first sub-liquid chamber side, forming said first orifice with a concave portion on said first sub-liquid chamber side covered by said support plate, and providing an opening at a part of a position corresponding to said concave portion on said support plate.

8. The control type liquid-in vibration isolating device as set forth in claim 1, wherein said partition main member includes a radially extending path adapted to receive a conduit, said path being arranged on one side of said partition main member, said partition main member further including a convex portion on a side of said partition main member opposite to said path on a lower surface of said partition main member facing said first diaphragm and a concave portion on said lower surface defining said first orifice, said concave portion being arranged to avoid said convex portion when forming said first orifice.

9. The control type liquid-in vibration isolating device as set forth in claim 1, wherein said partition main member and said partition plate member are connected to said body fitting.

10. A control-type liquid-in vibration isolating device, comprising:
- a vibration isolating substrate made of a rubber elastomer;
- a cylindrical body fitting connected to said vibration isolating substrate;
- a first diaphragm adhered to said body fitting opposite to said vibration isolating substrate,
- a partition portion interposed between said vibration isolating substrate and said first diaphragm and including a second diaphragm, a main liquid chamber being formed between said partition portion and said vibration isolating substrate, a first sub-liquid chamber being formed between said partition portion and said first diaphragm and a second sub-liquid chamber being formed in said partition portion on a side of said second diaphragm facing said main liquid chamber, said main liquid chamber and said first and second sub-liquid chambers being in fluid communication with one another, said partition portion comprising
- a partition main member defining a first orifice connecting to said first sub-liquid chamber, said partition main member including a radially extending path adapted to receive a conduit, said path being arranged on one side of said partition main member, said partition main member further including a convex portion on a side of said partition main member opposite to said path on a lower surface of said partition main member facing said first diaphragm and a concave portion on said lower surface defining said first orifice, said concave portion being arranged to avoid said convex portion when forming said first orifice, and
- a partition plate member defining a second orifice connecting to said second sub-liquid chamber, said second diaphragm being interposed between said partition main member and said partition plate member said first and second orifices sharing a common inlet/outlet on a side of said main liquid chamber, said first orifice being diverged from a part of a path of said second orifice having a smaller fluid resistance than said first orifice.

11. The control type liquid-in vibration isolating device as set forth in claim 10, wherein said second orifice has a sectional area larger than said first orifice.

12. The control type liquid-in vibration isolating device as set forth in claim 10, wherein said partition portion further comprises a support plate arranged between said partition main member and said first diaphragm, said support plate including a opening edge portion extending upwardly to define a central opening, said opening edge portion being press-fit into said concave portion on said lower surface of said partition main member.

13. The control type liquid-in vibration isolating device as set forth in claim 12, wherein said second diaphragm is spaced from said partition main member to define a switching chamber between said second diaphragm and said partition main member, said switching chamber being capable of selectively introducing atmospheric and negative pressure.

14. The control type liquid-in vibration isolating device as set forth in claim 13, wherein said second diaphragm has a circumferential edge portion, said circumferential edge portion of said second diaphragm being forced by said partition plate member to form said second sub-liquid chamber between said second diaphragm and said partition plate member, and a hollow space defined by said partition main member and said partition plate member is formed outwardly of said second sub-liquid chamber as said second orifice extending circumferentially.

15. The control type liquid-in vibration isolating device as set forth in claim 14, wherein a divergent path of said first orifice leading to a path of said second orifice is provided on an outer circumferential portion of said partition main member, an inlet/outlet into said main liquid chamber is opened on a part of said partition plate member, and a circumferential position of said partition plate member is adjustable relative to said partition main member.

16. The control type liquid-in vibration isolating device as set forth in claim 15, wherein said partition main member is configured by forming a concave portion for said second orifice continuously connected from the divergent path on said first sub-liquid chamber side, forming said first orifice between a concave portion on said first sub-liquid chamber side covered by said support plate, and providing an opening at a part of a position corresponding to said concave portion on said support plate.

17. The control type liquid-in vibration isolating device as set forth in claim 15, wherein said partition main member is configured by forming a concave portion for said second orifice continuously connected from the divergent path on said first sub-liquid chamber side, forming said first orifice with a concave portion on said first sub-liquid chamber side covered by said support plate, and providing an opening at a part of a position corresponding to said concave portion on said support plate.

18. The control type liquid-in vibration isolating device as set forth in claim 10, wherein said partition main member and said partition plate member are connected to said body fitting.

* * * * *